May 20, 1958 W. S. THOMPSON 2,835,013
LOAD HOOK SAFETY CATCH
Filed March 21, 1957 2 Sheets-Sheet 1
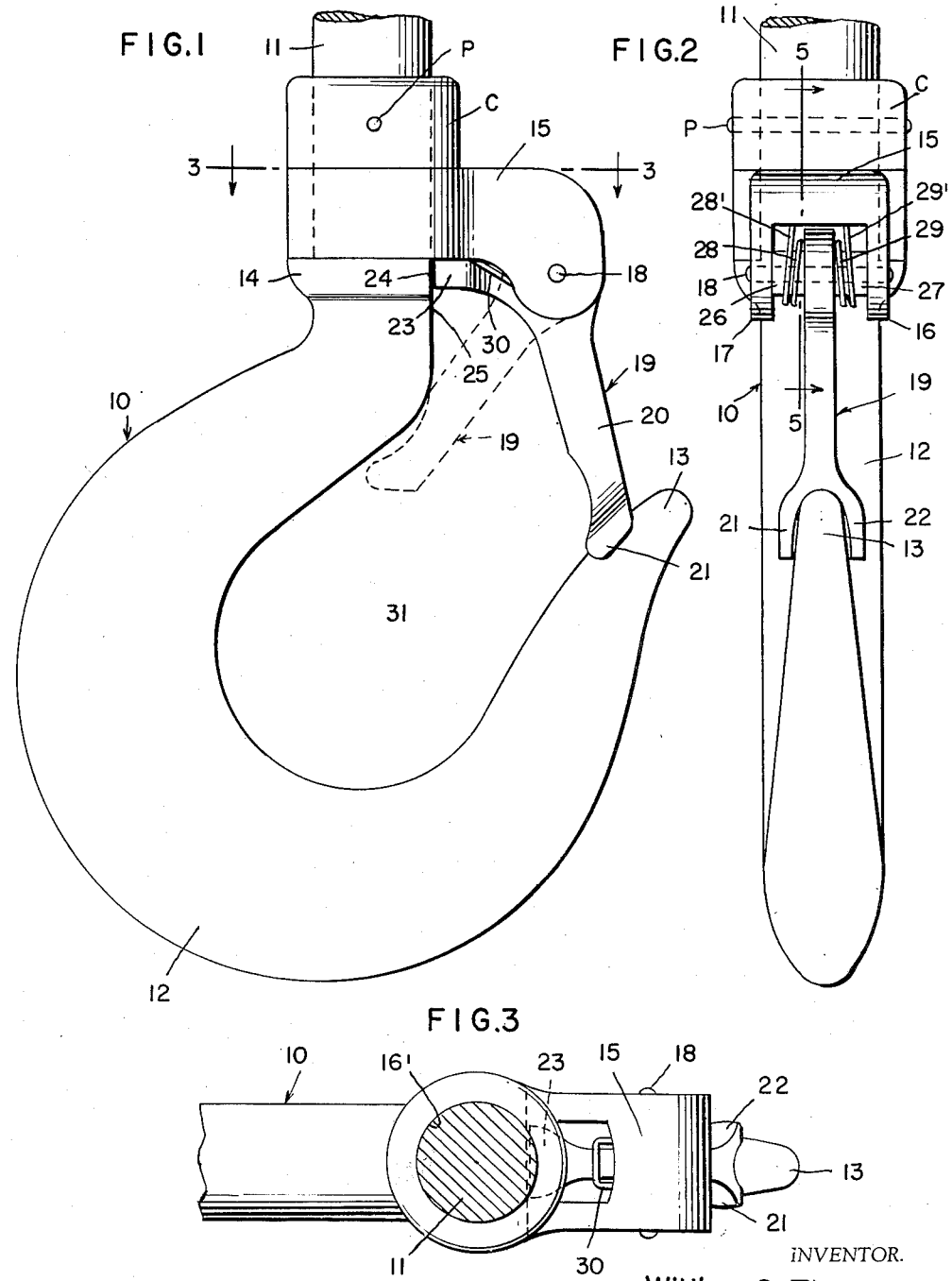
INVENTOR.
William S. Thompson
BY
Shoemaker & Mattare
ATTYS May 20, 1958 W. S. THOMPSON 2,835,013
LOAD HOOK SAFETY CATCH
Filed March 21, 1957 2 Sheets-Sheet 2
FIG.4
FIG.5
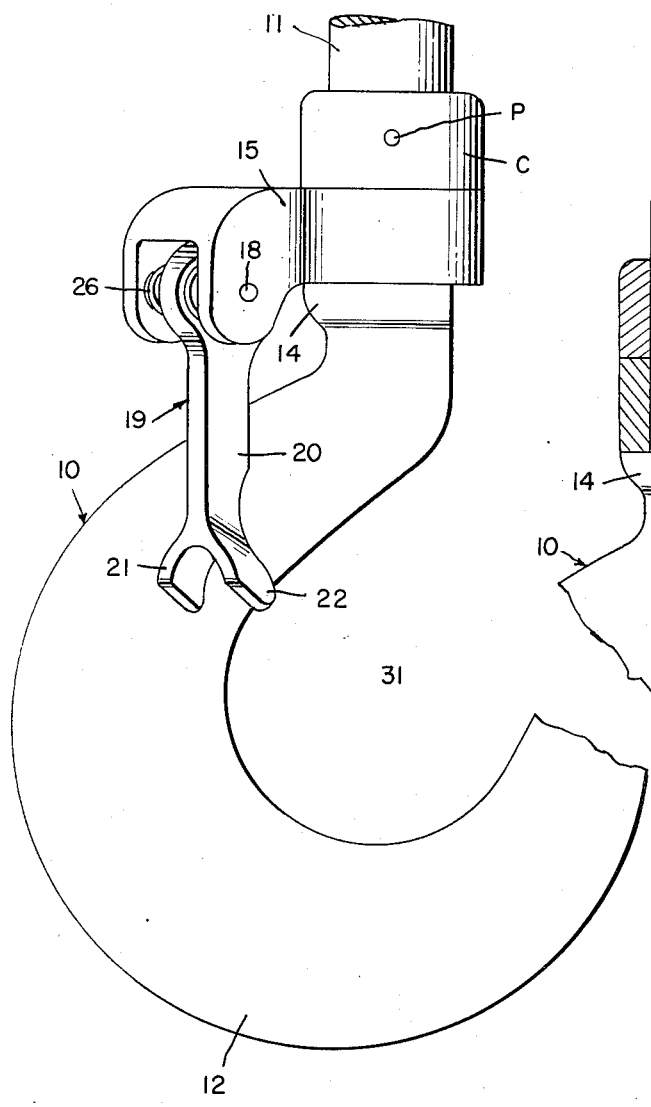
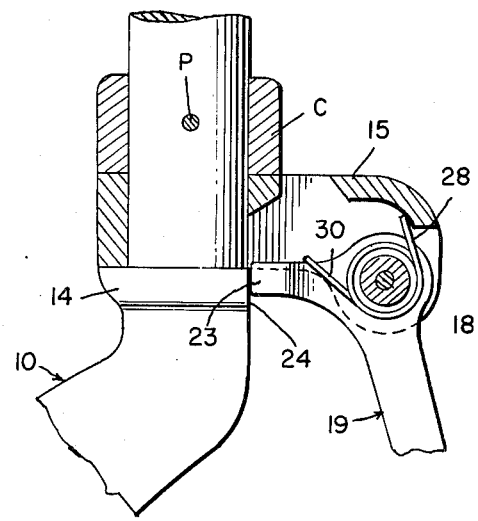
INVENTOR.
William S. Thompson
BY
*Shoemaker & Mattare*
ATTYS

United States Patent Office 2,835,013
Patented May 20, 1958

2,835,013

LOAD HOOK SAFETY CATCH

William S. Thompson, Watkins Glen, N. Y., assignor to Shepard Niles Crane and Hoist Corporation, Montour Falls, N. Y., a corporation of New York Application March 21, 1957, Serial No. 647,603

5 Claims. (Cl. 24—241)

This invention relates in general to safety catches for load hooks and more particularly pertains to an improved double-acting safety catch.

A primary object of this invention is to provide an improved safety catch for load hooks which is characterized by being positive in action and which, during normal use, serves to incorporate elements which interlock or interengage so as to positively prevent accidental opening of the safety catch mechanism.

A further object of this invention is to incorporate an improved form of safety catch for hooks and a hook construction particularly adapted for use therewith in which the safety catch embodies a two-piece construction, one of which is pivoted on the hook shank and the other of which is pivoted to the first for movement toward and away from the bill of the hook.

A further object of this invention is to provide an improved safety catch of the character set forth in the preceding object wherein the hook and the second element are so constructed as to prevent movement of the first element until the second element is swung away from engagement with the hook bill.

Another object of this invention is to provide an improved safety catch construction for load hooks wherein the hook is provided with a cylindrical shank portion joining with the main body portion of the hook and being provided thereat with a shoulder for receiving the apertured end of a swivel element which is normally free to rotate on the hook shank and wherein the opposite end of the swivel element is provided with a safety catch element pivotally attached thereto for movement into and out of engagement with the hook bill.

Still another object of this invention is to provide an improved form of safety catch in accordance with the preceding object wherein the hook is provided with a flat immediately below the shoulder and wherein the safety catch element is provided with an extension engageable with such flat when the safety catch element is in position engaging the bill of the hook so as to prevent rotation of the swivel element on the shank.

A further object of this invention is to provide an improved safety catch in conformity with the preceding object wherein the safety catch element is spring urged into hook bill engaging position and wheren the hook bill engaging end of the safety catch element is bifurcated to straddle the hook bill and prevent sideways disengagement therefrom.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a side elevational view showing the improved hook mechanism and illustrating the same in full lines in operative position with the safety catch element being shown in open position in dotted lines;

Fig. 2 is a front elevational view of the assembly shown in Fig. 1;

Fig. 3 is a horizontal section taken along the plane of section line 3—3 in Fig. 1;

Fig. 4 is a view similar to Fig. 1 but showing the safety catch assembly in the fully open position; and Fig. 5 is an enlarged sectional view taken substantially along the plane of section line 5—5 in Fig. 2 and illustrating the details of the spring urged safety latch element.

Referring at this time most particularly to Fig. 1, reference numeral 10 indicates generally a more or less conventional form of load hook including a shank 11, a main body portion 12 and terminating in the bill 13. Such hooks are commonly used for lifting heavy loads and are provided in various sizes and weights in accordance with the particular use to which they are to be put.

Although, as above stated, the hook may be of more or less conventional form, there are certain modifications which must be made in order to accommodate the improved safety catch assembly. One such modification is the provision of a cylindrical shank such as is indicated by the reference character 11 and as is shown most clearly in Fig. 3. The shank is of smaller diameter than the main body portion where it joins the same so as to provide a shoulder 14 at this point upon which the swivel element 15 is adapted to rest. The swivel element is provided with an aperture 16' receiving the cylindrical portion of the shank and is, therefore, swivelable about the axis of the shank. The opposite end of the swivel element 15 is provided with a pair of depending ear portions 16 and 17, see particularly Fig. 2, and extending between these ear portions is a pintle pin 18 which, for retention purposes, may be headed over at either end thereof.

The pintle carries a safety latch element indicated generally by the reference character 19 which, as is shown, is of bell crank configuration having a normally depending end portion 20 terminating in the bifurcations 21 and 22 which are adapted to straddle the bill portion 13 of the hook and thus positively lock therewith against sideways movement. The opposite end portion 23 of the safety latch element 19 is normally substantially horizontally disposed and is provided with a flat end portion 24 which is engageable with the flat surface 25 provided on the main body portion of the hook immediately below the juncture of the shank 11 with such hook.

Thus, it will be clear that when the safety latch mechanism is in the operative position as shown in full lines in Fig. 1, there is a double locking action. One is the action of the bifurcated end portions 21 and 22 straddling the hook bill 13 and serving to prevent sideways deflection of the latch element and the engagement of the latch end portion 24 with the flat 25 which serves to prevent swivelling of the element 15. Another feature of the flat 25 and the flat end 24 of the latch element is the self-aligning effect achieved thereby which will serve to align the catch assembly properly so that when it is released to assume its normal position, as will be hereinafter described, the bifurcated ends 21 and 22 will properly straddle the bill hook.

The intermediate portion of the latch element 19 is provided with laterally projecting boss portions 26 and 27 which extend between the opposed inner faces of the two ears 16 and 17 of the swivel element and the pintle 18 passes through this enlarged portion of the latch element. The boss portions 26 and 27 also serve to receive the coiled opposite end portions 28 and 29 of a tensioning spring which normally urges the latch member 19 to the full line position shown in Fig. 1 or, in other words, into engagement with the bill 13 of the hook. The intermediate portion 30 of the spring is of generally U-shaped configuration and passes over the top of the end portion 23 of the latch element 19, see particularly Fig. 5. The opposite free end portions of the spring element 28' and 29' extend away from the pintle 18 and engage the undersurface of the swivel element 15 as is shown most clearly in Fig. 5. The spring is preferably initially placed in position under tension. Thus, when the latch element is moved away from the bill 13 of the hook, the spring is placed under increasing tension and when released will automatically return to the bill engaging position provided, of course, that the swivel element 15 is in the proper position also.

Fig. 4 illustrates the fully open position of the safety latch assembly and, as shown, in this position the swivel element is swung to one side to permit the throat 31 of the hook to be entirely unobstructed and free so as to permit the passage therethrough of large cable elements or the like. It is to be understood that in some cases it will not be necessary to fully open the hook assembly as is shown in Fig. 4 but to only open the throat partially by springing back the latch element 19 as is illustrated in Fig. 1 by dotted lines. At the same time, it will be obvious that once the safety mechanism is properly engaged, it will prevent accidental disengagement of a cable or the like from the hook since the latch element straddles and bears against the hook bill and thus cannot be pivoted by pressure from the inside and, of course, the swivel element 15 cannot be pivoted about the shank 11 due to the engagement of the latch element with the flat 25 on the hook.

In other words, the safety latch mechanism is of compound construction permitting partial and full opening of the hook throat, as desired and yet incorporates features as hereinabove described which render it extremely efficient and effective for the purposes desired.

In order to retain the safety catch mechanism on the shank 11 of the hook, a retaining collar C is provided, being rigidly affixed to the shank by means of a suitable pin P or the like. Thus, the collar C cooperates with the shoulder portion 14 to retain the swivel element 15 in proper position but, of course, permits rotation thereof about the axis of the shank 11.

I claim:

1. A safety load hook comprising a hook including a substantially vertical shank and a curved main body portion terminating in a bill, a swivel element pivotally attached at one end to said shank and disposed in a substantially horizontal position, and a latch element pivoted to the free end of said swivel element for movement of one portion thereof into and out of engagement with said bill in one position of said swivel element to close the throat of said hook, another portion of said latch element and said body portion having engageable means for preventing rotation of said swivel element, and resilient means normally urging said latch element into bill engaging position and said engageable means of said latch element into engagement with the engageable means of said body portion.

2. A safety load hook comprising a hook including a substantially vertical shank and a curved main body portion terminating in a bill, said shank being of smaller diameter than the main body portion to present a shoulder at the juncture of the shank and the main body portion, a swivel element having an aperture at one end rotatably receiving said shank and resting upon said shoulder, a latch element pivoted to the free end of said swivel element about a substantially horizontal axis for movement of one end portion thereof into and out of engagement with said hook bill in one position of said swivel, said main body portion and the opposite end portion of said latch element being provided with engageable means for preventing rotation of said swivel element, and resilient means normally urging said latch element into engagement with said bill and urging the engageable means of said opposite end portion into engagement with said engageable means of said body portion.

3. A safety load hook comprising a substantially vertical shank and a curved main body portion terminating in a bill, said shank presenting a shoulder at the juncture of said shank and the main body portion, a substantially horizontally disposed swivel element provided with an aperture at one end rotatably receiving said shank and resting upon said shoulder, a latch element pivotally secured at the free end of said swivel element for movement into and out of engagement with said hook bill in one position of said swivel, said main body portion being provided with a flat surface immediately below said shoulder and said latch element including a portion engageable with said flat surface in said one position of the swivel whereby to prevent rotation of said swivel, and means normally urging said latch element into bill engaging position.

4. A safety hook as defined in and by claim 3 wherein the bill engaging end of said latch element is bifurcated so as to straddle said bill when engaged therewith.

5. A safety load hook comprising a substantially vertical shank and a curved main body portion terminating in a bill, said shank being of smaller diameter than the main body portion to present a shoulder at the juncture of the shank and main body portion, a substantially horizontal swivel element having an aperture at one end rotatably receiving said shank and resting upon said shoulder, the free end of said swivel element having a pair of depending spaced ears formed thereon, a latch element of bell crank form having an intermediate boss portion disposed between said ears, a pintle passing through said ears and said boss portion of said latch element to pivotally attach said latch element to the free end of said swivel element about a substantially horizontal axis, the outer end of said latch element being bifurcated to straddle said hook bill and completely close the throat of said hook, said main body portion having a flat surface formed thereon adjacent said shoulder, the opposite end of said latch element being engageable with said flat surface when the latch element is in its bill engaging position whereby to prevent rotation of said swivel element, and resilient means normally urging said latch element into its bill engaging position.

References Cited in the file of this patent

UNITED STATES PATENTS 2,796,651     Ratcliff                June 25, 1957

FOREIGN PATENTS 1,100,137     France                 Sept. 16, 1955